United States Patent [19]
Forgione

[11] 3,915,649
[45] Oct. 28, 1975

[54] BILIRUBIN TEST MATERIAL
[75] Inventor: Peter Salvatore Forgione, Stamford, Conn.
[73] Assignee: American Cyanamid Company, Stamford, Conn.
[22] Filed: Aug. 14, 1974
[21] Appl. No.: 497,438

[52] U.S. Cl. ............ 23/253 TP; 23/230 B; 252/408
[51] Int. Cl.² .......................................... G01N 33/16
[58] Field of Search ...... 23/230 B, 253 TP; 252/408

[56] References Cited
UNITED STATES PATENTS
3,511,607  5/1970  Green ............................. 23/230 B
3,814,586  6/1974  Fraser, Jr. et al. ................ 23/230 B
3,825,411  7/1974  Morin .............................. 23/230 B
3,853,476  12/1974  Rittersdorf et al. ............. 23/253 TP Primary Examiner—R. E. Serwin
Attorney, Agent, or Firm—Frank M. Van Riet

[57] ABSTRACT

A diagnostic test indicator for the detection and determination of the concentration of bilirubin in sera comprising a bibulous material, which has contained therein the dried residue resulting from the impregnation thereof with
1. maleic acid,
2. starch and
3. a diazonium salt, and a process for the production of said indicator, are disclosed.

13 Claims, No Drawings

BILIRUBIN TEST MATERIAL

BACKGROUND OF THE INVENTION

The use of diagnostic tests in the clinical testing of patients has become increasingly common in recent years. Many of these tests employ the use of test papers wherein the individual conducting the test merely contacts a reactive paper strip with a suspect material, usually a body fluid, and observes the color change or color intensity thereof in order to determine whether or not a particular effect is achieved. Test strips or cards of this type have been devised for glucose determination and treponemal diseases, for example.

Most tests for the detection of the concentration of bilirubin in body fluids have, until now, consisted of intricate liquid or tablet systems whereby accelerators such as caffiene, acetamide, etc. must be employed. There has therefore existed, for a substantial period of time, the need for a simple testing mechanism for the determination of the concentration of bilirubin in sera, which long-felt need is satisfied by the instant invention, more fully discussed hereinbelow.

SUMMARY

As mentioned briefly above, I have now discovered a novel test means for the determination of the concentration of bilirubin in body fluids without the use of instrumentation. My test means is useful for the qualitative detection and quantitative determination of bilirubin wherein the test means comprises a reagent composition incorporated within a bibulous carrier and excludes the need for extraneous accelerators.

The quantitative determination of bilirubin is extremely important in the detection of bilirubin liver diseases, in that the concentration of bilirubin in the blood is elevated noticeably over its normal concentration when diseases of the liver exist. The early detection of such an abnormal rise in bilirubin concentration can therefore obviously lead to a more accurate and rapid diagnosis of liver maladies and consequently, the more rapid treatment thereof.

Because early diagnosis of abnormal liver conditions is so important, a test for the detection of variables in the concentration of bilirubin in the blood must not only be rapid and simple enough for the clinician to carry out but accurate enough to enable the diagnosis to be made without extreme chances of error or false readings. Such a mechanism is represented by the novel test indicators of the present invention. Utilizing my novel system, no instrumentation is necessary and no mixing or reconstitution of reagents is needed. Testing can therefore be conducted at home or in the doctor's office without any special equipment.

Although many tests useful in the detection of bilirubin have been known e.g. see U.S. Pat. No. 3,585,004, British Pat. Specification No. 1,330,094, Clinica Chemica Octa, Columbo et al, Vol. 51, pages 217–219, 1974, incorporation of known solution reagents in a bibulous system represents serious problems because the diazonium salt color indicator must be used at an optimum pH in order to achieve the best results. I have overcome this serious problem by incorporating a buffer system to maintain the narrow pH range necessary. A stabilizer is also incorporated into the system. My novel indicators enable the detection of bilirubin concentrations in sera at significant levels in less than about three minutes. The unique combination of ingredients used enables the instant indicators to be of higher sensitivity and larger shelf life than existing systems.

DESCRIPTION OF THE INVENTION INCLUDING PREFERRED EMBODIMENTS

My novel diagnostic test indicators for the determination of the concentration of bilirubin comprise a bibulous carrier material, such as cellulosic paper, which contains therein the dried residue resulting from the impregnation thereof with various reagent materials.

In the preparation of my novel indicators, the solution with which the bibulous material is to be impregnated is prepared by first forming an aqueous solution of starch. The starch functions as a stabilizer for the diazonium salt indicator and is preferably added to the impregnating solution first, however, it may be added to the impregnating solution last or at any other time during the solution preparation. The starch is employed in stabilizing concentrations, i.e., those ranging from about 1.0% to about 5.0%, preferably from about 3.0% to about 4.0%, (W/V). The starch enables the resultant test indicators of this invention to be stored without deterioration, especially at 10°C. and preferably over a drying agent.

To the starch containing impregnating solution is then added the maleic acid in a concentration ranging from about 5.0% to about 30.0%, preferably from about 10.0% to about 22.0%, (W/V) to maintain the pH of the impregnating solution on the acid side, i.e., about 1.7–2.9.

The diazonium salt is then added to the resultant impregnating solution in concentrations ranging from about 0.1% to about 2.0%, (W/V) preferably from about 0.5% to about 1.0%. This material is capable of imparting to the area of the bibulous material which comes into contact with the sera, a color of such varying intensity as to be representative of the concentration of the bilirubin which is present therein. The diazonium salts per se are well known in the art and generally have the formula (I)
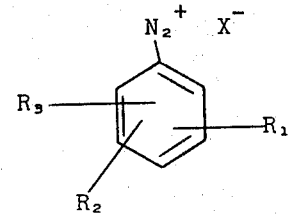

wherein $R_1$, $R_2$ and $R_3$ are, individually, H, $NO_2$, $CH_3$, $OCH_3$, Cl or $NHCOC_6H_5$, and $X^-$ is $Cl^-$, or $BF_4^-$. The indicator is then prepared by dipping the bibulous material in the resultant impregnating solution, recovering the so impregnated material and drying. Although the above method of impregnating the bibulous material is preferred, it is also possible to impregnate the material with individual solutions of the ingredients with drying of the bibulous material between each impregnation.

The impregnation time of the impregnations, either individual or combined, discussed above, is not critical as long as the bibulous material is fully saturated by the solution with which it is contacted. Generally, submersion of the bibulous material in the solution for from about 5 to 15 minutes is sufficient in most cases.

After the starch is added to the water, the suspension is preferably warmed in order to effect dissolution of the starch. Hot water can also be used. The resultant solution is then preferably cooled before the diazonium salt is added thereto. If desired, of course, the starch solution or the maleic acid can be added to a preprepared solution of the diazonium salt in such a concentration that the final starch, maleic acid and salt concentrations fall within the abovespecified limits.

The pH of the impregnated bibulous test indicator should range from about 1.7 to about 2.9, in order for the indicator to function at the optimal reactivity of the diazonium salt. The depth or intensity of color and reactivity is materially reduced at pH's outside of this range.

In order to obtain the most uniformly impregnated bibulous material and thereby the most accurate test indicator, I have found it advantageous, but not critical, to use a suitable non-ionic wetting agent in the impregnating solution so as to assure complete coverage of the surface of the bibulous materials when contacting them with the solution. For instance I may utilize the fatty alkanolamides, i.e., reaction products of an alkanolamine with a fatty acid such as lauric acid or stripped coconut fatty acid, suitable alkanolamines being diethanolamine, monoethanolamine, monoisopropanolamine, etc.; ethylene oxide derived materials, i.e., those derived from the reaction of ethylene oxide with alkylphenols wherein the alkyl group is octyl, nonyl or higher, long chain fatty alcohols such as tridecyl alcohol, lanolin, lecithin alcohol etc., long chain fatty acids such as lauric acid, tall oil, oleic acid, abietic acid etc., long chain fatty mercaptans, long chain fatty amines, polyoxypropylene glycol, fatty sorbitan ester; sugar esters, i.e., the alcoholysis reaction products of the methyl ester of a fatty acid and sucrose or raffinose; polysorbitol; methyl cellulose; ethoxylated phenol/formaldehyde resins and the like. Polyoxyethylene-long chain fatty acid ethers are preferred. Amounts ranging from about 0.01 part to 1.0 part of wetting agent per 100 parts of solution, may be used.

The mechanism by which the instant test indicators function, although not wishing to be bound by any expressed theory, is believed to occur thusly:

It can therefore be seen that once the sera is added to the test indicator, the bilirubin therein causes a reaction which eventually results in the coupling of the diazonium salt, i.e., the formation of a colored indicator, the intensity of which is directly proportional to the concentration of the bilirubin in the sera. The clinician merely compares the color which results to a standard color chart to ascertain the bilirubin concentration in the serum being tested.

The indicators of the present invention generally exhibit various intensities of red which are indicative of high bilirubin levels in the test sera to yellow which indicates a normal bilirubin level.

The above concentrations expressed in connection with the components which may be incorporated into my novel indicators are set forth as to the solution of these components which is saturated onto the bibulous carrier only and is not meant to specify the amount of each component which is eventually present on the bibulous carrier. That is to say, saturation of the bibulous carrier with a specific concentration of a specific component in solution will not unequivocally incorporate into the bibulous carrier the same amount or percentage of component present in the solution. I have found however, that the above concentrations of components in solution are generally sufficient so as to incorporate sufficient component into the bibulous material upon saturation therewith to produce a functional test indicator, the absorptive capabilities of the bibulous material being characteristic of materials generally used for this purpose.

The following examples are set forth for purposes of illustration only and are not to be construed as limitations on the present invention except as set forth in the appended claims. All parts and percentages are by weight unless otherwise specified.

EXAMPLE 1

A 3.0% starch solution is prepared by slowly adding, with stirring, 3.0 parts of soluble starch to 100 parts of boiling water. The resultant solution is then cooled to room temperature and the following components are added in the order specified: 11.0 parts of maleic acid, 0.2 parts of a 10% aqueous solution of polyethylene (23) lauryl ether and 0.5 part of p-nitrobenzene diazonium fluoroborate. The pH is 2.4.

A commercially available Whatman No. 3 cellulosic paper is dipped into the resultant solution for 7 minutes and is then dried.

A drop of suspect serum is then added to the test paper and is allowed to set for 3 minutes. The test paper turns violet red indicating an abnormal concentration of bilirubin. Control serum containing a normal bilirubin concentration turns the test paper yellow.

EXAMPLE 2

The procedure of Example 1 is again followed except that the diazonium salt used is that corresponding to Formula I, above, wherein $R_1$ is 2-methoxy, $R_2$ is 4-$NHCOC_6H_5$, $R_3$ is 5-methyl and $X^-$ is $Cl^-$. Similar results are achieved.

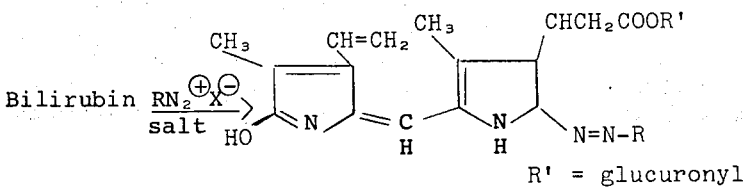

EXAMPLE 3

The procedure of Example 1 is again followed except that the polyethylene (23) lauryl ether is omitted and the paper is dipped into the solution for 10 minutes. Substantially identical results are observed.

EXAMPLE 4

Example 1 is again followed except that the bibulous material is Whatman No. 42 cellulosic paper. Again, a deep red spot appears on the resultant indicator when an abnormally high bilirubin concentration is present in the test serum.

I claim:

1. A diagnostic test indicator for the detection and concentration determination of bilirubin in sera comprising a bibulous material which contains therein, at a pH of from about 1.7 to about 2.9, the dried residue resulting from the impregnation thereof with
   1. maleic acid
   2. starch and
   3. a diazonium salt.

2. A diagnostic test indicator according to claim 1 wherein said (3) is a 2-methoxy-4-benzamido-5-methyl diazonium salt.

3. A diagnostic test indicator according to claim 1 wherein said (3) is p-nitrobenzene diazonium fluoroborate.

4. A diagnostic test indicator according to claim 1 wherein said bibulous material is paper.

5. A process for the preparation of the diagnostic test indicator of claim 1 which comprises impregnating a bibulous material with an aqueous solution of said (1), (2) and (3) and thereafter drying the thus impregnated material.

6. A process according to claim 5 wherein said (3) is 2-methoxy-4-benzamido-5-methyl diazonium chloride.

7. A process according to claim 5 wherein said solution of (1), (2) and (3) is at a pH of from about 1.7 to about 2.9.

8. A process according to claim 5 wherein said (3) is p-nitrobenzene diazonium fluoroborate.

9. A process according to claim 5 wherein said bibulous material is paper.

10. A diagnostic test indicator according to claim 1 which contains (4) a wetting agent.

11. A diagnostic test indicator according to claim 10 wherein said (4) is polyethylene lauryl ether.

12. A process according to claim 5 wherein said solution includes (4) a wetting agent.

13. A process according to claim 12 wherein said (4) is polyethylene lauryl ether.

* * * * *